Jan. 27, 1970  P. A. HARRIS  3,492,559
WARNING LAMP CIRCUITS FOR USE IN BATTERY CHARGING SYSTEMS
Filed Sept. 8, 1967
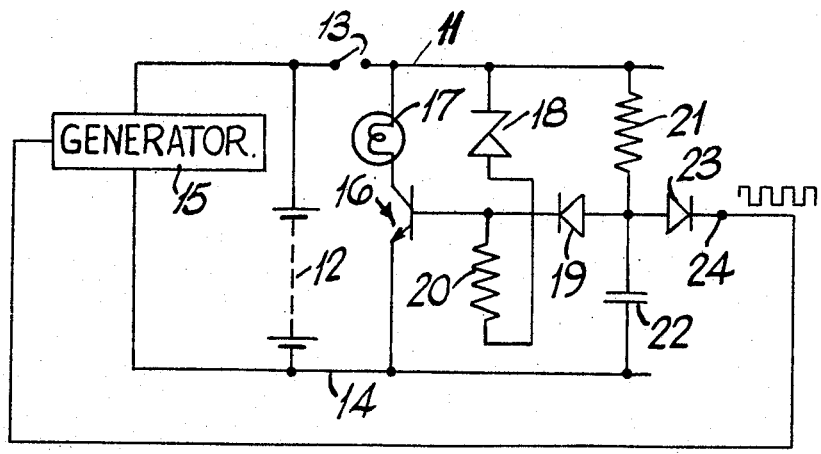
Inventor
Paul Anthony Harris
By Hancock Downing & Seebold
Attorneys

# United States Patent Office 3,492,559
Patented Jan. 27, 1970

3,492,559
WARNING LAMP CIRCUITS FOR USE IN BATTERY CHARGING SYSTEMS
Paul Anthony Harris, Stonnall, England, assignor to Joseph Lucas (Industries) Limited, Birmingham, England, a British company
Filed Sept. 8, 1967, Ser. No. 666,321
Claims priority, application Great Britain, Sept. 9, 1966, 40,307/66
Int. Cl. H02j 7/04, 7/10
U.S. Cl. 320—48       2 Claims

ABSTRACT OF THE DISCLOSURE

A warning lamp circuit for a battery charging system includes means operable in use to illuminate a warning lamp until a generator in the battery charging system produces an output. Further means operate the same warning lamp if the output voltage of the generator should rise above a predetermined value, to give a warning, for example, that the voltage regulator is faulty.

---

This invention relates to warning lamp circuits for use in battery charging systems.

A warning lamp circuit according to the invention includes means operable in use to illuminate a warning lamp until a generator in the battery charging system produces an output, and further means for illuminating the same warning lamp whenever the output voltage of the generator is above a predetermined value.

The accompanying drawing is a circuit diagram illustrating one example of the invention.

Referring to the drawing, there is provided a positive supply line 11 which is connected to the positive terminal of the vehicle battery 12 through an ignition switch 13, and a negative supply line 14 connected to the negative battery terminal. The battery 12 is charged by a generator 15, which may be a dynamo and associated cut-out, but preferably is an alternator and associated full-wave rectifier.

The circuit further includes an n-p-n transistor 16 having its emitter connected to the line 14 and its collector connected to the line 11 through a warning lamp 17. The base of the transistor is connected to the line 11 through a resistor 20 in series with the anode-cathode path of the Zener diode 18, and is also connected to the cathode of a diode 19. The diode 19 has its anode connected to the lines 11, 14 respectively through a resistor 21 and a capacitor 22, the junction of the resistor 21 and capacitor 22 being connected through the anode-cathode path of a diode 23, to a terminal 24 which is associated with the generator so that an A.C. signal for the generator appears at the terminal 24. In the case of an alternator, the terminal 24 is connected to a phase point.

When the ignition switch 13 is closed, current flows through the resistor 21 to charge the capacitor 22. As long as the capacitor 22 is not charged, no current flows through the diode 19, and so the transistor 16 is off. However, as soon as the capacitor 22 is charged current flows through the diode 19 and turns the transistor 16 on, so that the warning lamp 17 is illuminated. Thus, when the switch 13 is first closed but before an attempt is made to start the vehicle, then of course the generator is not producing an output and so the transistor 16 conducts and the warning lamp 17 is energised. As soon as the generator 15 produces an output, an alternating signal will appear at the terminal 24 which will consist of alternate positive and negative signals. When the signal at the terminal 24 is positive, then the diode 23 clearly cannot conduct because its anode is not at a greater positive potential than its cathode, but when the signal at the terminal 24 is negative, then the diode 23 is forward biased and conducts. Assuming that the first signal is positive, then the circuit will remain in the same condition with the lamp 17 on. When the first negative signal appears the diode 23 conducts, and current flowing through the resistor 21 is diverted through the diode 23 and the generator in preference to passing through the diode 19. At the same time, the capacitor 22 starts to discharge through the diode 23 in preference to discharging through the diode 19, the discharge of the capacitor 22 being occasioned by the fact that its positive upper plate is now connected to a negative point of potential. Thus at this stage base current is removed from the transistor 16 and the lamp 17 is extinguished. When the next positive signal appears at the terminal 24, the diode 23 does not conduct but current flowing through the resistor 21 must charge the capacitor 22 before it can flow through the diode 19 to turn on the transistor 16 again. The circuit values are so chosen that before the capacitor 22 has become fully charged, another negative signal appears at the terminal 24, and so it will be seen that as long as the alternating signal appears at the terminal 24, the transistor 16 is held off.

The breakdown voltage of the Zener diode 18 is chosen to be slightly above the setting of the voltage regulator associated with the battery charging system. If for any reason the voltage between the lines 11, 13 rises above this value (for example if the voltage regulator fails), the Zener diode 18 breaks down and provides base current through the resistor 20 to the transistor 16, so that the transistor 16 is rendered conductive and the warning lamp 17 is again illuminated.

The diode 23 also prevents short-circuiting of the alternator through the base-emitter path of the transistor 16, and the diode 19 and resistor 20 prevent short-circuiting of the alternator by the Zener diode 18.

It will be appreciated that numerous other arrangements are possible, and that the transistor 16 need not be in series with the warning lamp 17.

Having thus described my invention what I claim as new and desire to secure by Letters Patent is:

1. A warning lamp circuit for use in a battery charging system, comprising means operable in use to illuminate a warning lamp until a generator in the battery charging system produces an output, and further means for illuminating the same warning lamp whenever the output voltage of the generator is above a predetermined value, said circuit including a capacitor, a switch through which the capacitor is charged when the switch is closed, and a transistor having its base-emitter circuit connected across the capacitor in series with a diode so that the transistor conducts when the capacitor is charged, the transistor when conductive illuminating the warning lamp, and means being provided for maintaining the capacitor sufficiently discharged when the generator is producing an output to turn the warning lamp off.

2. A circuit as claimed in claim 1 in which said further means comprises a voltage sensitive device which when the output voltage of said generator is above said predetermined value conducts to provide base current to the transistor irrespective of the state of charge of the capacitor.

References Cited

UNITED STATES PATENTS

| | | | |
|---|---|---|---|
| 3,173,073 | 3/1965 | Hetzler et al. | 320—48 |
| 3,210,727 | 10/1965 | McLaughlin et al. | 320—48 X |
| 3,217,311 | 11/1965 | Custer | 320—48 X |
| 3,231,811 | 1/1966 | Peras | 320—48 |
| 3,336,519 | 8/1967 | Grimm | 322—99 X |
| 3,417,310 | 12/1968 | Hill | 320—48 |

LEE T. HIX, Primary Examiner

S. WEINBERG, Assistant Examiner

U.S. Cl. X.R.

322—99